United States Patent [19]
Warrow

[11] Patent Number: 5,142,497
[45] Date of Patent: Aug. 25, 1992

[54] SELF-ALIGNING ELECTROACOUSTIC TRANSDUCER FOR MARINE CRAFT

[76] Inventor: Theodore U. Warrow, 10620 Mount Vernon Dr., Apt. 103, Taylor, Mich. 48180

[21] Appl. No.: 440,792

[22] Filed: Nov. 22, 1989

[51] Int. Cl.$^5$ .......................................... H04B 17/00
[52] U.S. Cl. ...................................... 367/12; 367/173
[58] Field of Search ................ 367/12, 138, 104, 157, 367/165, 166, 171, 173, 180, 178, 188; 248/291, 462

[56] References Cited

U.S. PATENT DOCUMENTS

| | | | |
|---|---|---|---|
| 3,553,638 | 1/1971 | Sublett | 367/12 |
| 4,109,757 | 8/1978 | Hebberd | 367/188 |
| 4,285,485 | 8/1981 | Burke | 367/173 |
| 4,485,462 | 11/1984 | Wiegner | 367/12 |
| 4,893,290 | 1/1990 | McNeel et al. | 367/178 |
| 4,897,824 | 1/1990 | Stokes | 367/104 |

Primary Examiner—Thomas H. Tarcza
Assistant Examiner—Daniel T. Pihulic
Attorney, Agent, or Firm—Harness, Dickey & Pierce

[57] ABSTRACT

A transducer apparatus for marine pleasure craft employs only gravity-induced forces to always orient its electroacoustic transducer in a downward direction or other predetermined direction. The apparatus mounts on the transom or hull of a pleasure craft, and includes a housing having a smoothly shaped exterior to permit laminar water flow past it. The housing has an internal cavity of preferably spherical shape in which a transducer assembly is mounted. The assembly includes an electroacoustic transducer and a transducer support structure that allows the transducer to move freely on account of gravity about a center of rotation in at least two orthogonal directions as the craft pitches and/or rolls. The transducer assembly is preferably constructed to have an overall specific gravity about equal to that of the liquid so it essentially floats in the liquid. The center of mass, the center of rotation, and the center of buoyancy of the transducer assembly are preferably spaced in order along a common vertical axis from bottom to top. An electric cable extends upwardly from the center of the transducer to the top of the spherical cavity, and has some slack to minimize drag on the assembly. A first embodiment of the transducer assembly resembles a truncated sphere. In a second embodiment of the assembly, the transducer is supported by two concentrically arranged rings in a gimbal configuration. A third embodiment of the transducer assembly includes a transducer support ring pivotably mounted on opposed ball bearings that travel in vertically arranged arcuate guide channels. Two magnetic latching mechanisms for releasably holding the apparatus in place on the transom of the craft are also disclosed.

35 Claims, 6 Drawing Sheets

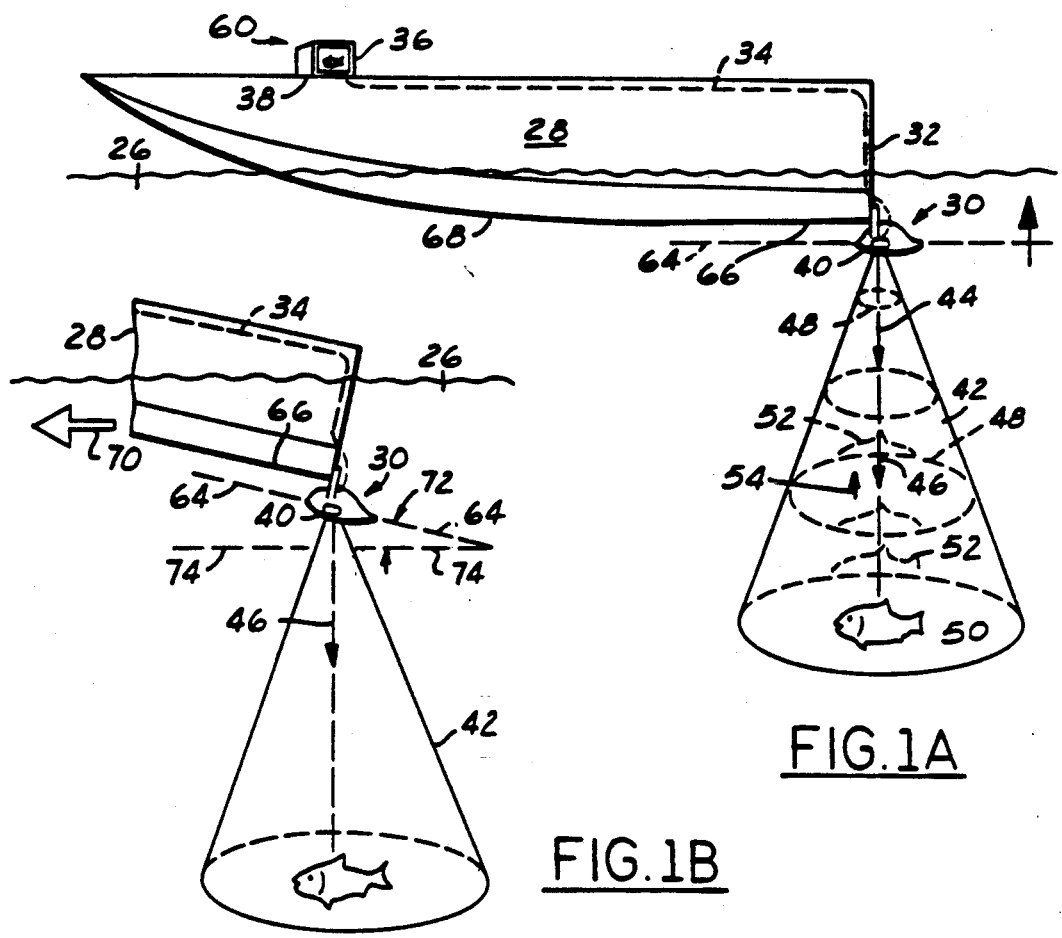
FIG.1A
FIG.1B
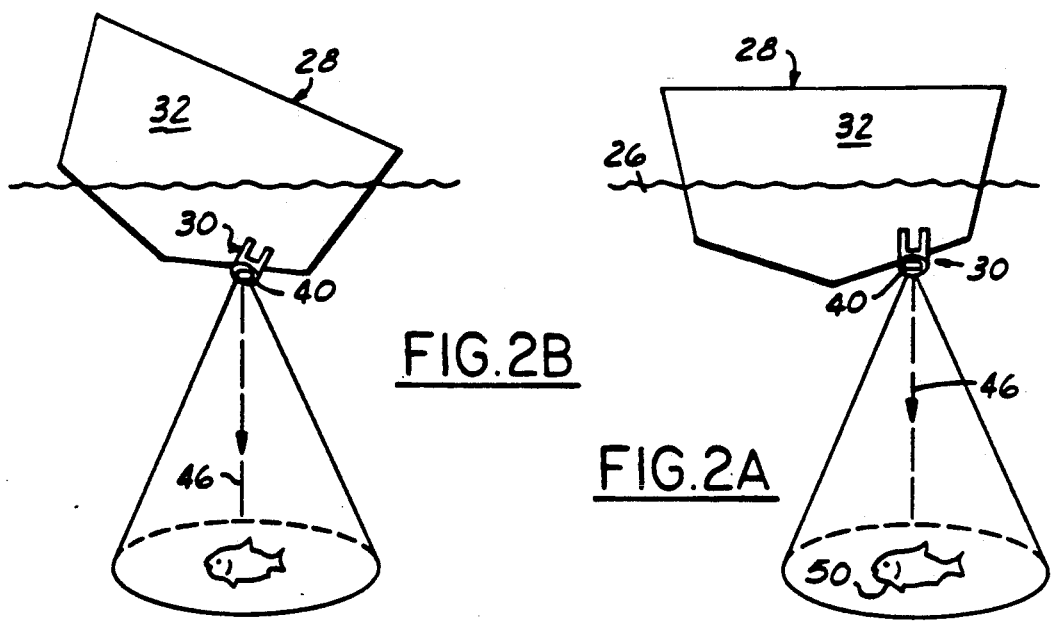
FIG.2B
FIG.2A

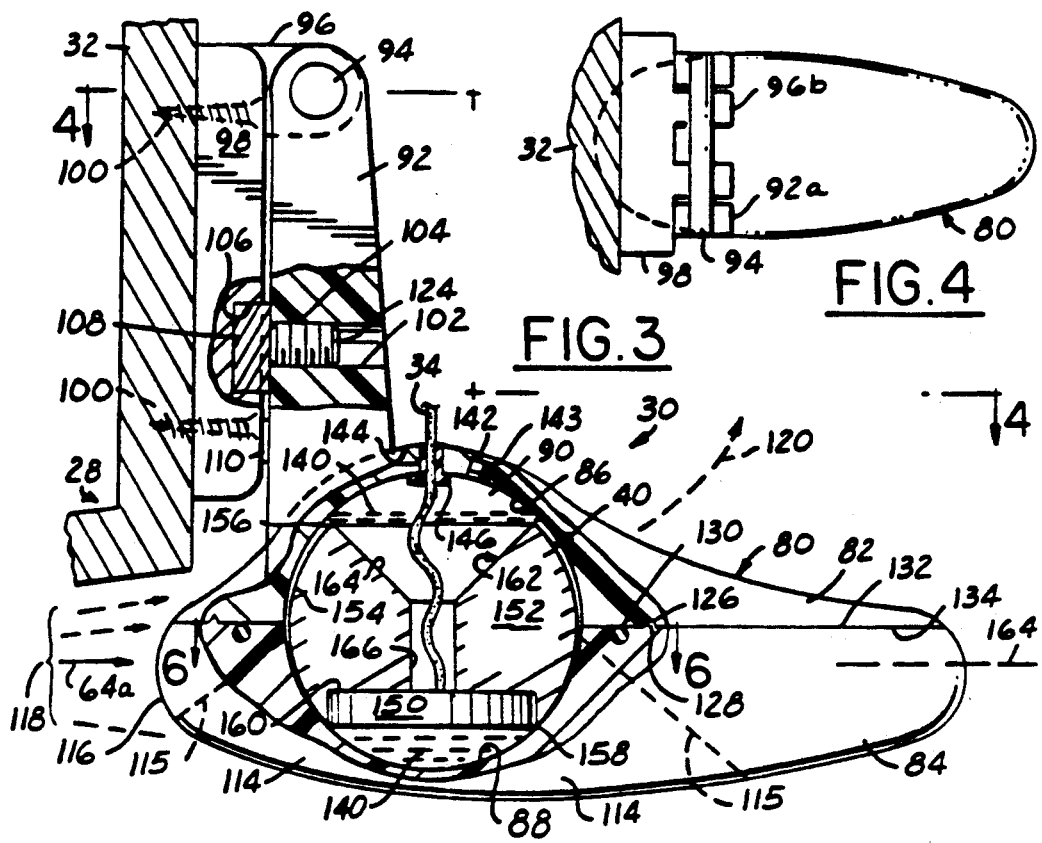
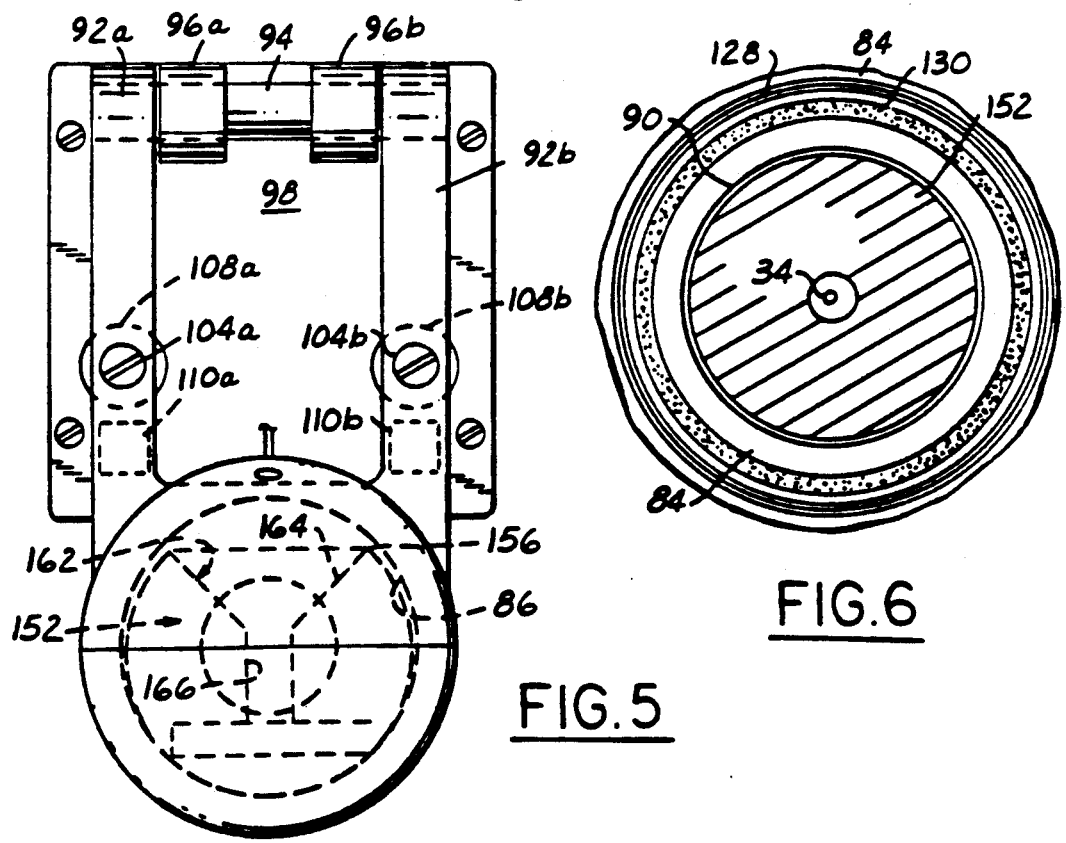

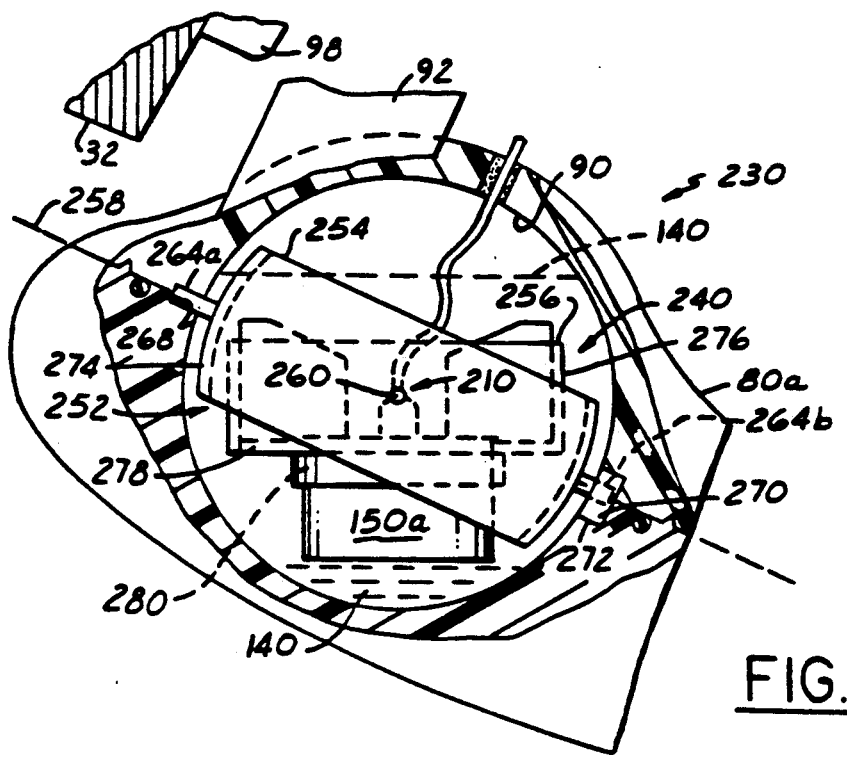
FIG. 11
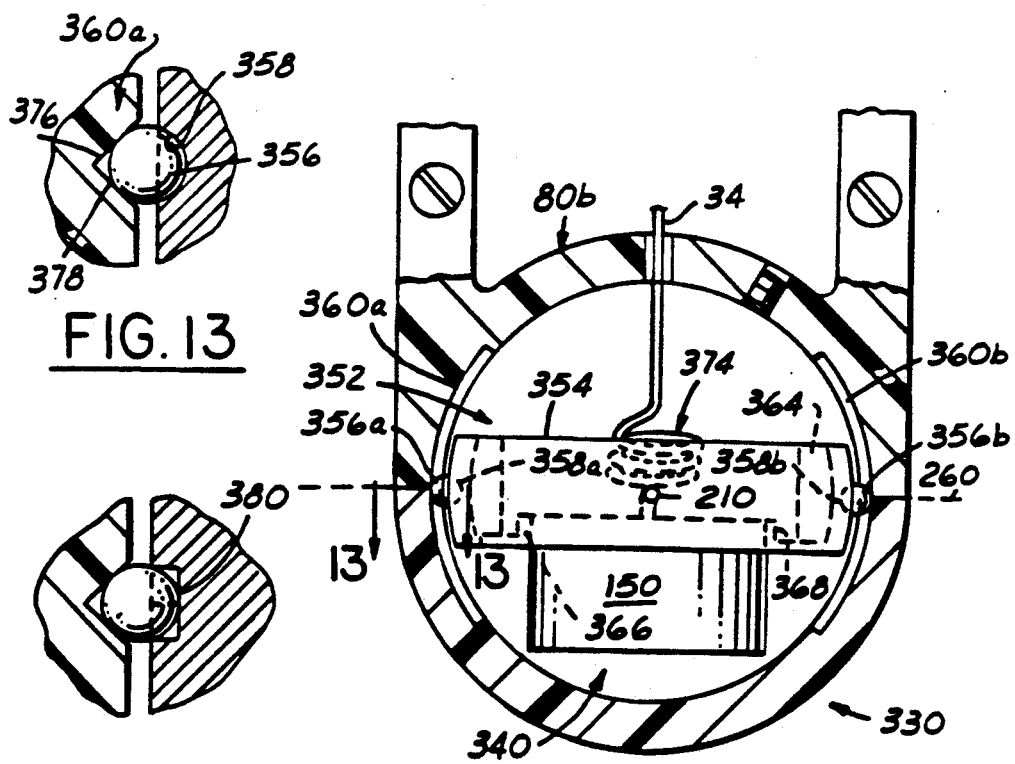
FIG. 13
FIG. 14
FIG. 12

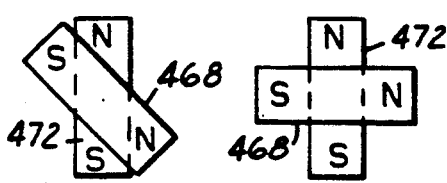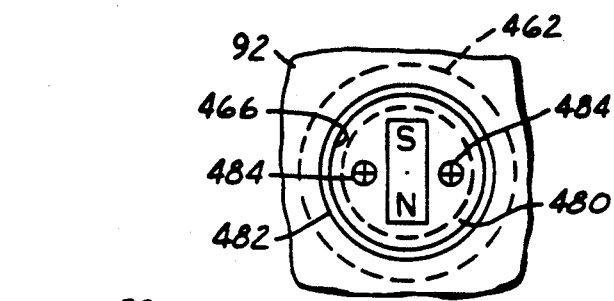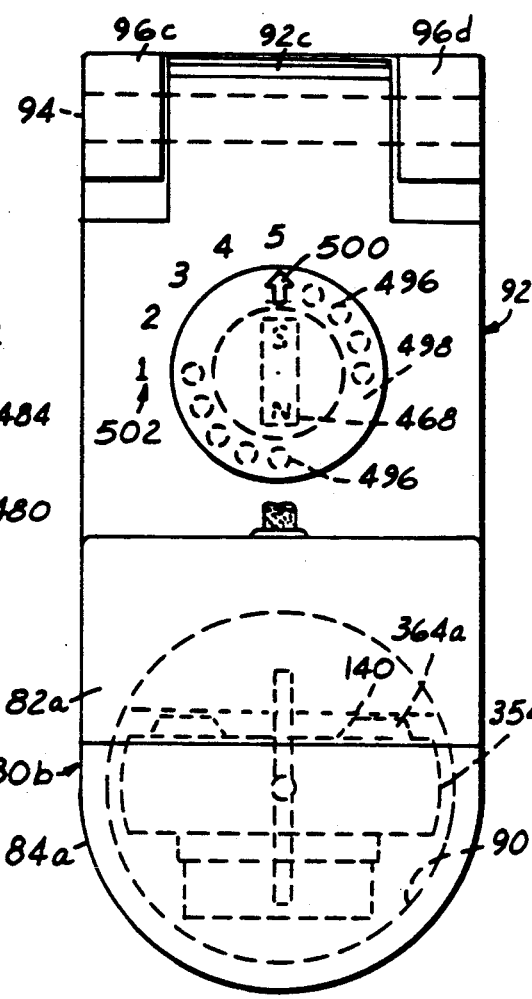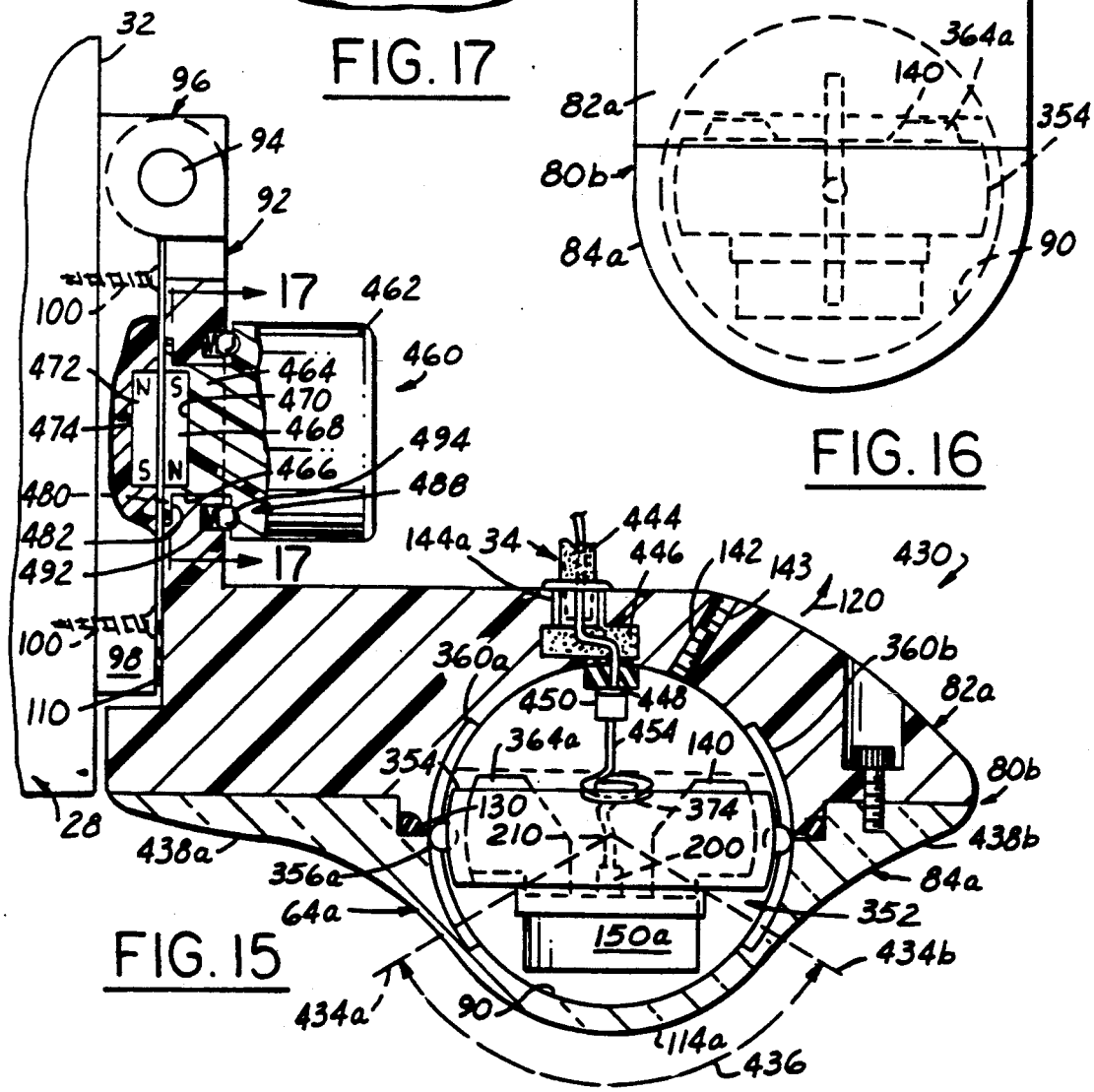

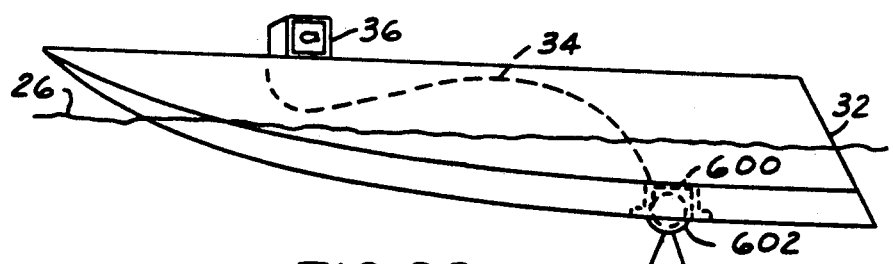
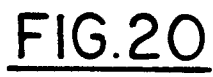
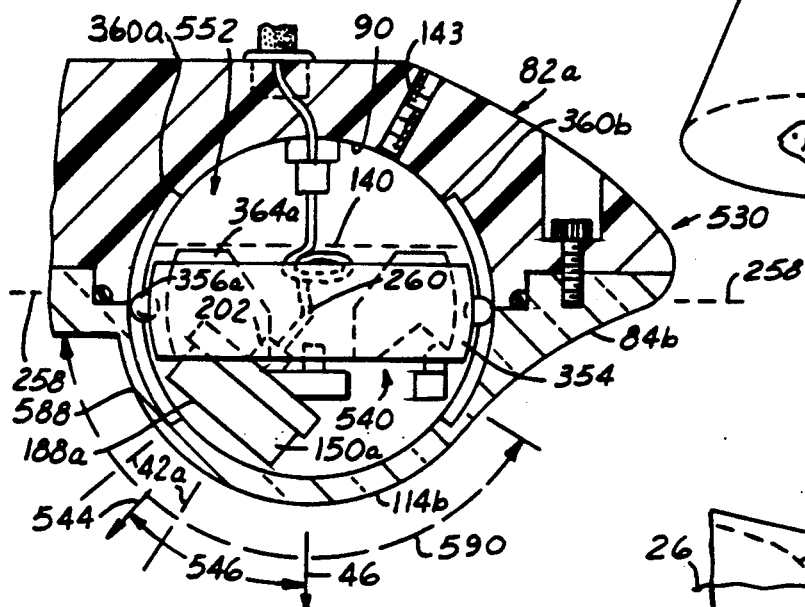
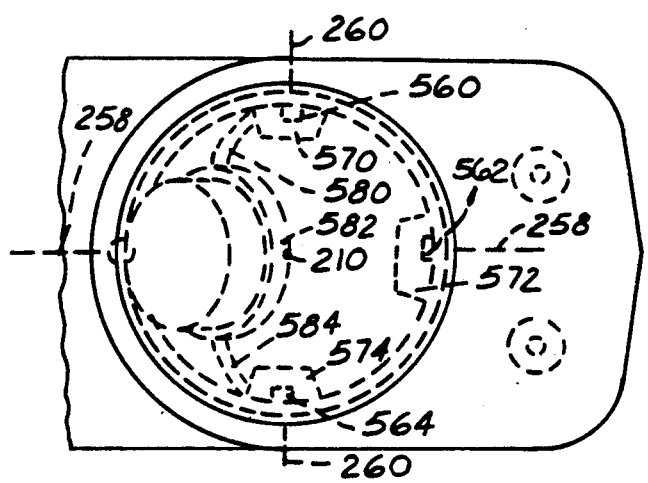
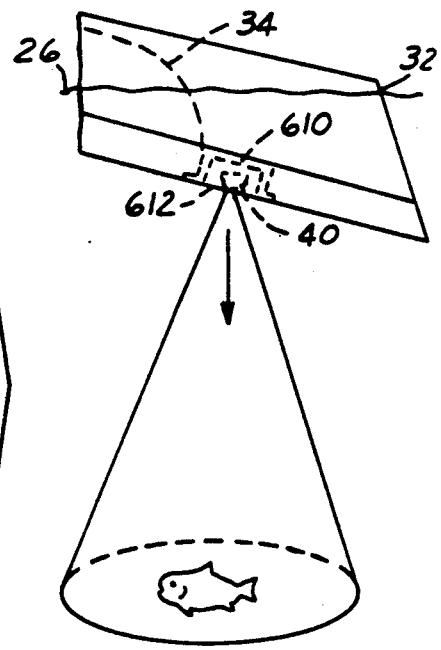

SELF-ALIGNING ELECTROACOUSTIC TRANSDUCER FOR MARINE CRAFT

BACKGROUND OF THE INVENTION

1. Field of the Invention

The present invention relates in general to ultrasonic transducer units used for depth finding, fish finding and the like on marine pleasure craft, and in particular to self-aligning transducer apparatuses for marine applications which use gravity to align an electroacoustic transducer in a desired direction.

Electronic depth finders employing sonar transducers have been known and used for many years. They are also called by various other names, such as depth flasher, fish finder, depth meter, depth recorder and video sonar. The word sonar is an acronym for "sounding, navigation and ranging." A sound tone is created electronically, typically using a piezoelectric crystal transducer, and sent out into the water in a cone-like beam. The speed of sound in water is about 4,950 feet per second. When that sound wave hits a solid object, part of the sound is reflected back to the source as an echo, and is picked up by the same transducer. By carefully timing how long it takes for an echo to return, it is possible to determine the distance between the source and the object.

The relatively low-cost electronic sonar systems that are widely used today by fishermen and pleasure boaters employing a main control box located in the boat and having an electronic device that creates an electrical signal which travels from the main box through an electrical cable to a transducer device that is immersed in the water. The typical electroacoustic transducer operates at a given ultrasonic frequency in a range between about 25 KHz and 250 KHz, and is a controlled sound wave energy transmitter and receiver that converts the electrical impulse into a high frequency sound impulse that is inaudible to fish as well as to humans. The transducer is typically aimed at the bottom of the body of water or at objects beneath the pleasure craft. The echo bounces back to the transducer which reconverts that sound back into an electrical impulse which travels back up the cable and, after appropriate signal processing, shows up on a readout of the main control box as a blip or mark that normally can be read directly in terms of feet or fathoms.

One of the chief problems experienced by pleasure boaters or fishermen, especially on rough bodies of water, is that the direction in which the cone of the transducer points is not stable. In conventional pleasure boats, the transducer is normally rigidly attached to the hull or to a support bracket off the transom. Thus as the boat pitches or rolls on account of wave action, on account of the boat keeling to one side in a turn, or on account of changes in speed, the direction of the cone emanating from the transducer varies accordingly. This results in random unstable and changing echo return signals. This random ranging produces a chart or display filled with undesirable clutter and fails to clearly define the desired field of view or its contents.

A number of sonar systems now employ recording mechanisms which produce a paper chart showing the bottom being scanned by the transducer, or display the same kind of information on a display screen such as a cathode ray tube (CRT). So, as the direction of the cone changes, the accuracy and usefulness of the resulting graphical display is seriously impaired. When the water is rough, the display may go blank if the return signals are too scrambled to decode, or the sonar system may fail to show fish that are in fact in the the water below the boat, even though the same system would show clearly such fish in calmer waters when the boat was more stable. Thus it would be highly desirable to provide a relatively inexpensive and reliable transducer apparatus that provides the stability needed in a transducer in order to have a stable directional beam emanating therefrom.

A number of systems have been developed over the years in an effort to provide a stabilized transducer which is capable of sending out a sonar signal in a stable direction in spite of the rolling and/or pitching of the craft. All of these devices known to me are somewhat bulky and complex in construction. A number of these devices employ the force of gravity in an effort to provide a stabilized transducer. Such systems are disclosed in the following U.S. patents:

| No. | U.S. Pat. No. | Granted | Inventor |
|---|---|---|---|
| 1. | 2,019,497 | 1935 | Kuntze |
| 2. | 2,407,697 | 1946 | Williams |
| 3. | 2,759,783 | 1956 | Ross |
| 4. | 2,832,944 | 1958 | Kessler |
| 5. | 3,518,676 | 1970 | Kirknes |
| 6. | 3,553,638 | 1971 | Sublett |
| 7. | 3,563,335 | 1971 | Holmes |
| 8. | 4,144,518 | 1979 | Minohara et. al. |

The devices disclosed in the first, second, fourth and sixth listed patents employ a pendulous mountings for a transducer assembly. Further, a number of these patents disclose transducers which are mounted in liquid filled chambers. However, as disclosed in the fifth patent, namely U.S. Pat. No. 3,518,676, these prior art systems suffered from a damping influence of the liquid which at times impedes the swinging movement of the pendulously mounted transducer to the extent that it would not to be able to compensate for the pitching and rolling movements of the ship and the sea. Thus the system disclosed in the fifth patent provides a servo control system to take care of this problem. The seventh patent discloses a mechanically stabilized platform which is strictly mechanical in operation and is designed to overcome the limitations of the prior art purely mechanical systems and to obviate the need to employ servo control systems for applying corrective position adjustments to a transducer. The eighth patent is also mechanical in its approach. However, both of the seventh and eighth patents disclose systems which are fairly complex and cannot easily be put into the small spaces typically occupied by conventional transducers on pleasure craft.

Thus, it is apparent that there is still a significant need for a small, relatively low-cost, reliable self-aligning transducer apparatus which does not require sophisticated electronic servo controls for stabilization. Further, there is a need for a small self-contained and self-aligning apparatus which in spite of being immersed in a liquid is not so heavily damped by the liquid as to be unable to keep up with the pitching or rolling of the boat. Of course, the small vessels, such as pleasure craft, are fairly lightweight and have a smaller displacement, and therefore roll and pitch back and forth much more actively than do larger commercial vessels. Hence, any self-aligning transducer for pleasure craft must be able to respond even more quickly and faithfully than the prior art systems for larger commercial vessels disclosed in the foregoing patents.

In light of the foregoing problems and needs, it is an object of the present invention to provide a self-aligning transducer apparatus including an electroacoustic transducer which continuously points in a predetermined direction independent of the pitching and rolling of a marine craft to which it is attached.

It is another object of the present invention to provide a compact, low-cost, highly reliable self-aligning transducer apparatus. It is a further object of the present invention to provide a self-aligning transducer apparatus with the ability to respond quickly and faithfully to the pitching and rolling of even small marine pleasure craft, such as sport boats and bass boats used for fishing.

SUMMARY OF THE INVENTION

In light of the foregoing problems and in order to fulfill the foregoing objects, there is provided, in accordance with a first aspect of the present invention, a self-aligning transducer apparatus for mounting to a marine craft which employs gravity to maintain a transducer in the apparatus in a predetermined orientation, such as a vertically downward direction. The transducer apparatus comprises: a transducer housing having a cavity; a liquid at least partially filling the cavity; and a transducer assembly mounted within the cavity that includes an electroacoustic transducer and transducer support means for carrying the transducer. The transducer assembly has a center of rotation, a center of buoyancy, and a center of mass nominally arranged along a common vertical axis coincident with the gravity vector. The center of buoyancy is located above the center of rotation, and the center of mass is located below the center of rotation.

The transducer is preferably of cylindrical configuration with disc-shaped upper and lower surfaces. The transducer assembly may further comprise a flexible electrical cable for passing electrical signals between the transducer and a remotely located apparatus for processing the electrical signals. The transducer is preferably hermetically sealed in a casing or coating of protective material, and the electrical cable is preferably connected to the center of the disk-shaped nonemanating surface of the transducer at or near the center of rotation, to minimize its movement. The transducer support means preferably includes buoyant material arranged concentrically about the vertical axis and generally vertically above the transducer.

There are three different embodiments of the transducer assembly of the present invention described below and illustrated in the Figures. In accordance with a second aspect of the present invention, the first embodiment of the transducer assembly employs a transducer housing having a substantially spherical cavity therein, and a bottom portion generally beneath the cavity which is substantially transparent to acoustic waves within a predetermined frequency range of interest, which is determined by the operating frequency of the electroacoustic transducer to be employed within the transducer apparatus. The liquid which at least partially fills the cavity is also preferably substantially transparent to acoustic waves within the predetermined frequency range.

In this first embodiment, the transducer assembly has a transducer structure and a transducer support means for buoyantly supporting the transducer structure within the liquid for rotation about the center of the spherical cavity. The transducer structure includes an electroacoustical transducer which has a specific gravity greater than that of the liquid, and a transducer support means including flotation material having a specific gravity lower than that of the liquid. The support structure also has a curved exterior surface which guides movement of the transducer assembly about the center of the spherical cavity.

The transducer assembly is preferably constructed to have an overall specific gravity close to that of the liquid filling the chamber, which requires using buoyant material to offset the weight of the denser components of the transducer assembly. In practice, the overall specific gravity of the transducer assembly may be slightly greater than, the same as, or less than that of the liquid. Two important advantages of making the specific gravity of the assembly close to that of the liquid is that it helps minimize frictional forces during rotation, and it improves the ability of the transducer assembly to quickly and accurately compensate for the pitching and rolling of the boat.

According to another aspect of the present invention, there is provided a second embodiment of the transducer assembly which includes a transducer structure and transducer support means for supporting the transducer structure for rotation about a predetermined center of rotation located within the cavity of the housing. The transducer support means includes first and second support frames respectively mounted for rotation about first and second axes perpendicular to one another and which pass through the center of rotation. Preferably the first and second support frames are concentric rings arranged in gimbal configuration.

According to yet another aspect of the present invention, there is provided a third transducer assembly also having a transducer structure and transducer support means. The support means of this third assembly includes a support frame mounted for rotation about first and second axes of rotation perpendicular to one another with the location of at least one of the axes being determined at least in part by ball bearings located on opposite sides of the support frame. In this third embodiment of the transducer assembly, the support frame includes a first ring, and the housing, which has interior surfaces defining the cavity, includes in such surfaces a plurality of guide tracks arranged in a vertical plane that allow the ball bearings to move back and forth therein so that the support frame can partially rotate about the second axis of rotation.

In accordance with still another aspect of the present invention, there is provided a magnetically coupled transducer apparatus which is releasably held in place relative to the exterior of a marine pleasure craft. The transducer apparatus comprises: a transducer housing; means for pivotably supporting the housing; and magnetically coupled latching means for releasably holding the transducer housing in place relative to the exterior of the craft. The latching means preferably includes at least one magnet for retaining the housing in the predetermined location relative to the exterior of the craft until sufficient force is applied to the housing, by an obstacle or by water rushing past the housing as the boat moves forward faster and faster, such that the magnetic holding force of a latching means is overcome. At that time, the housing then pivots, on account of the external force applied by the obstacle or water, in a generally rearwardly and upwardly arc away from the predetermined location. The magnetic holding force may be manually adjusted by changing the spacing between the magnet and a ferromagnetic piece of material to which it is attracted in order to hold the housing in the predetermined location. Preferably, however, two magnets are provided, and the magnetic holding force is changed by altering the orientation of the two magnets relative to one another.

These and other aspects, features, advantages and objects of the present invention may be further understood by referring to the detailed description, accompanying Figures, and appended claims.

BRIEF DESCRIPTION OF THE DRAWINGS

The drawings form an integral part of the detailed description of the preferred embodiments and are to be read in conjunction therewith. Like reference numerals designate the same or similar components or features in the various Figures, where:

FIG. 1A is a side elevational view of a pleasure craft using a sonar system which includes the self-aligning transducer apparatus of the present invention; and FIG. 1B is a fragmentary view of the FIG. 1A craft pitched backward at an angle and illustrating how the beam from the transducer apparatus still points straight down;

FIGS. 2A and 2B are rear views of the FIG. 1A craft showing the self-aligning transducer of the present invention pointing straight down irrespective of the degree of roll of the craft;

FIG. 3 is a side elevational view of a first version of a first embodiment of the self-aligning transducer apparatus of the present invention in partial cross-section and mounted to the transom of the FIG. 1 craft, with the spherical chamber therein substantially filled with liquid and the transducer structure pictured by not quite buoyant enough to float;

FIG. 4 is a top view of the FIG. 3 transducer apparatus taken along line 4—4 of FIG. 3;

FIG. 5 is an end view of the FIG. 3 transducer apparatus;

FIG. 6 is fragmentary cross-sectional view of the FIG. 3 transducer apparatus taken along line 6—6 of FIG. 3;

FIG. 11 is a fragmentary side elevational view of a second embodiment of the self-aligning transducer apparatus of the present invention in partial cross-section illustrating a gimbaled mounting for the transducer;

FIG. 12 is a fragmentary side elevational view of a third embodiment of the self-aligning transducer apparatus of the present invention in partial cross-section illustrating a single ring mounting for the transducer which uses a pair of opposed ball bearings which move in a guide track;

FIG. 13 is a cross-sectional view taken along line 13.13 of FIG. 11 showing one of the ball bearings captivated in a hemispherical socket and a V-groove guide track;

FIG. 14 is a cross-sectional view like FIG. 13 but showing a rectangular socket;

FIG. 15 is a side cross-sectional view of a fourth embodiment of the self-aligned transducer apparatus of the present invention illustrated in another configuration for the transducer housing and mounting bracket, and for the magnetic latching means;

FIG. 16 is a rear-end view of the FIG. 15 embodiment;

FIG. 17 is a fragmentary cross-sectional view of the magnetic latching means taken along line 17—17 of FIG. 15;

FIGS. 18 and 19 are diagrams of the two magnets of the FIG. 15 embodiment arranged at a 45° angle and a 90° angle respectively;

FIG. 20 is a fragmentary cross-sectional side-view of a fifth embodiment of the transducer assembly of the present invention within a housing identical to that of FIG. 15, except for the lower portion shown;

FIG. 21 is a bottom view of FIG. 20, illustrating the placement of a counter-weights on the ring of FIG. 20;

FIG. 22 is a side elevational view of a pleasure craft using a sonar system which includes the self-aligning transducer apparatus of the present invention mounted in and protruding from the hull of the craft; and FIG. 23 is a fragmentary view of the FIG. 15A craft pitched backward at an angle and illustrating how the beam from the transducer still points straight down.

DETAILED DESCRIPTION OF THE PREFERRED EMBODIMENTS

Figure 7:
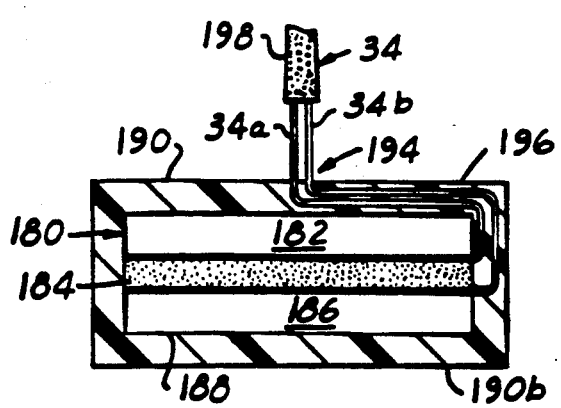
FIG. 7 is a cross-sectional side view through the center of a first encapsulated transducer used within the transducer apparatuses of the present invention.

FIGS. 1A through 2B show, in a body of water 26, a small marine Pleasure craft 28, which may be any conventional boat such as a powerboat or rowboat, with a self-aligning transducer apparatus 30 of the present invention mounted on the craft's transom 32 and connected by a conventional electrical cable 34 to a main control box 36 located near the front portion 38 of the boat. The transducer apparatus 30 includes an electro-acoustical transducer assembly 40 (shown in simplified form as a rectangle) which produces directional ultrasonic signals that are directed downwardly and spread out in a cone-like shape 42 along a vertical line 44 coincident with a gravity vector 46. The spreading sound waves, represented by dotted lines 48 move downwardly until they strike an object, such as one (or more) fish 50 (or bottom structure of the body of water), which produces an echo return signal that is reflected back toward the transducer 40, as represented by dotted lines 52 and upward arrow 54. The overall sonar system 60 formed by the transducer apparatus 30, the electrical cable 34 and control box 36 may be used for many of the purposes for which sonar is employed, such as fish finding, depth finding, and studying the bottom structure of the body of water on which the boat is being used. The control box 36 may take any suitable or conventional form, such as a flasher unit, which displays the fish or bottom depth in terms of bands of light on a calibrated dial, a meter unit employing a needle in combination with a dial, a recorder or graph unit which interprets the signal for the operator and actually draws or prints out a permanent picture of the bottom showing the slopes and drop-offs, boulders, logs and fish, combination flasher-recorder units which provide the speed reading of the flasher unit and the means for obtaining a detailed graph of bottom formations, or a video sonar unit which provides a direct readout on the face of a GRT or other flat panel display.

In FIG. 1A, the boat 28 is shown in stationary position with the longitudinal axis 64 of the transducer unit 30 being essentially horizontal like the back portion 66 of the hull 68 of the boat. In FIG. 1B, the boat is shown being driven forward as indicated by arrow 70 at a significant speed such as 10 knots, and accordingly the boat 28 is pitched backwards by a significant angle 72 which for convenience is shown by the intersection of the longitudinal axis 64 with the horizontal plane represented by dashed line 74. Nevertheless, the transducer assembly 40 remains horizontal and accordingly the cone 42 is still pointing directly downward and has its axis coincident with the gravity vector 46.

FIGS. 2A and 2B show the boat 28 from the rear. In FIG. 2A, the boat is substantially level, and the beam points straight down from the transducer assembly 40. In FIG. 2B, the boat is shown leaning at a significant angle to its starboard side, but on account of the self-aligning feature of the transducer apparatus 30, the transducer assembly 40 still points straight down along gravity vector 46. Thus, FIGS. 1 and 2 respectively illustrate that the transducer apparatus 30 of the present invention is capable of maintaining of the cone-like beam 42 of ultrasonic acoustical signals directed straight down even as the boat 28 pitches backward or forward and/or rolls laterally from port to starboard or vice versa.

FIG. 3 is a side elevational view of the transducer apparatus 30 mounted to the transom 32 of boat 28, showing selected areas thereof in partial cross-section in order to reveal the internal structure of the first embodiment. The apparatus 30 includes the transducer assembly 40, a housing 80 having upper and lower section 82 and 84 with hemispherical cavities 86 and 88 formed therein to create a spherical chamber 90. The apparatus 30 also includes a mounting strut means or structure 92 which pivots about pin 94 that is retained by hinge block or gudgeon 96 extending from stationary mounting plate 98 that is rigidly fastened to the transom 32 by suitable fasteners 100. The strut 92 includes a threaded bore 102 in which is a threaded plug 104 of galvanized iron, other ferromagnetic material, or a magnet is placed as shown. On mounting plate 98 is located a recess 106 into which a permanent magnet 108 made of conventional magnetic material is placed across from the plug 104. The magnetic attraction between plug 104 and magnet 108 tends to keep the strut 92 butted against the mounting block 98. A bumper pad 110 of neoprene, rubber or other similar pliant material may be employed if desired to cushion the contact between the mounting strut 92 and the mounting plate 98.

The housing sections 82 and 84, the strut 92 and mounting plate 98 may be made out of any suitable material, but preferably are made of non. ferromagnetic molded high-impact plastic material. The lower housing section 84, or at least the portion 114 thereof generally located about lower hemisphere of the cavity 90 up to the dashed lines 115, should preferably be made of a material which is acoustically transparent to the ultrasonic acoustic signals transmitted and received by the transducer assembly 40 inside.

One suitable transparent plastic material for the housing 80 is polyvinyl chloride material sold under Code No. TA406-75A from the Teknor Apex Company in Pawtucket, Rhode Island. This material can be readily injection molded using conventional chrome-plated injection molding dies into having cavities of any desired shape for the housing sections 82 and 84 and cavity portions 86 and 88. This material can also be used to hermetically seal the transducer structures as will be discussed below with respect to FIGS. 7 and 8.

The operation of the magnetically coupled latch mechanism formed by plug 104 and magnet 108 will now be described. When the boat 28 travels through the water, the water flows along the hull and strikes the bulbous front end 116 of the housing 80 as indicated by dashed lines 118. This produces a force generally centered along the longitudinal axis 64 of the housing 80, as indicated by arrow 64a. When this force becomes large enough, it overcomes the combined effect of gravity acting on housing 80 and strut 92 and the magnetic coupling between plug 104 and magnet 108 which hold strut 92 against the mounting plate 98. When the force 64a is great enough, the combined holding force is overcome, and the housing 80 swings generally rearwardly and upwardly, as indicated by dashed arrow 120. Also, if a sandbar, submerged stump or floating debris pass under the hull of the boat and strike the housing, the transducer apparatus will be automatically released and swing upwardly when such objects apply a force greater than the holding force to the transducer housing.

The amount of latching force may be varied by adjusting the proximity of the ferromagnetic plug 104 to the magnet 108. To facilitate this process, the threaded plug may be provided with a screwdriver slot 124 or other suitable manual tool connection means for enabling the plug to be backed out of threaded bore 102. The amount of magnetic holding power is reduced as the gap between the plug 104 and the magnet 108 is increased. This adjustment allows the operator of the boat to determine the point at which the transducer housing 80 will swing upwardly and thus present reduced drag as the boat moves forward at a high rate of speed. The magnetic coupling means preferably releases the housing somewhere between 4 to 15 knots.

FIGS. 4 and 5 show the transducer apparatus 30 of FIG. 3 from a top view and a rear end view respectively. As may be seen in these Figures, the strut means 92 may be formed of two parallel members 92a and 92b spaced from one another and located outside of two hinge blocks 96a and 96b. Similarly, two cylindrical magnets 108a and 108b and two manually adjustable ferromagnetic plugs 104a and 104b may be provided for releasably holding under magnetic power the struts 92 to the mounting plate 98.

The internal construction of the transducer apparatus 30 will now be discussed. The upper and lower housing sections 82 and 84 may be joined in any suitable or conventional manner, including using glue, screws, or bolts (not shown), or interlocking complementary surfaces (not shown) which snap or otherwise snugly fit together. Complementary alignment grooves 126 and ridges 128 may also be provided to ensure accurate assembly of the sections 82 and 84. A gasket 130, which may be a neoprene O-ring, may be employed if desired, to help make surfaces 132 and 134 at the bottom and top of housing sections 82 and 84 respectively liquid tight about the cavity 90. For reasons which will be explained below, the cavity 90 of the housing preferably is at least partially filled with a liquid shown by a dashed line 140. The liquid is preferably transparent to acoustical signals in the frequency range of operation of the transducer assembly, and may be inserted via a suitable threaded small fill plug 142 which removably seals a threaded hole 143 preferably located in the top portion of the cavity 90.

Different types of fluid may be used for the liquid 140, a number of which are mentioned in the above-listed patents. Another fluid which would work is a mixture of kerosene and mineral oil will result in a fluid which is acoustically transparent to the desired ultrasonic frequencies. Kerosene is heavier than water, while mineral oil is lighter than water, and thus the ratio between the two can result in any degree of acoustic coupling desired, including a specific gravity of 1.0, just like water. Water itself may be used for the fluid, provided that care is taken to prevent the water from becoming foul with age due to bacteria, algae or the like. To prevent this problem, conventional additives used in industrial cooling tower water systems or other closed loop water systems may be added to the water 140 to prevent fouling. Alternatively, the deionized water or other sterile water may be used without such additives as the liquid 140 as long as steps are taken to ensure that the transducer assembly and the cavity 90 are similarly sterile, and the cavity 90 is sealed and remains in a sterile condition inside. The liquid 140 is also preferably optically transparent, like water, particularly for those embodiments which have a transparent housing portion, so that a user or prospective purchaser of the apparatus of the present invention can pick up the apparatus and move its housing around to verify that indeed the transducer assembly does maintain a constant direction no matter how the housing rolls or pitches. Besides water, another suitable optically transparent fluid which may be used as the liquid 140 is high-purity isoparaffinic liquid material, such as "Isopar K," available from the Exxon Chemical Company of Houston, Texas.

The electrical cable 34 preferably enters the cavity through an aperture 144 which is suitably sealed with a plastic or rubber grommet 146, epoxy or the like once the wire 34 has been passed therethrough. The grommet 146 as shown may be made with a mushroom head as shown that projects into the top portion of the cavity 90 in order to shield the cable 34 from damage when the transducer assembly 40 rotates sufficiently far to contact same. This might happen, for example, when the housing 80 swings upwardly and rearwardly when released by the magnetic coupling mechanism as has been described above.

FIGS. 3, 5 and 6 show the first embodiment of the transducer assembly 40. In this embodiment, the transducer assembly includes a transducer structure 150 in the shape of a squat cylinder resembling a hockey puck, and a transducer support means 152 having an exterior surface 154 in the shape of a truncated sphere with the top portion ending at circular edge 156 and the bottom portion ending at circular edge 158. A disk-like recess 160 is provided in support means 152 for snugly holding the transducer structure 150. The interior of the sphere includes a funnel-like cavity 162 preferably having a conical surface 164 sloped in the range of 25° to 65° from the vertical and a cylindrical region 166 therebelow to provide a conduit through which cable 34 may pass on its way to the center of the circular upper surface of transducer structure 150. The portion of the cable 34 within the cavity 90 has a predetermined amount of slack, so that the wire will not interfere with the oscillation of the transducer assembly 40 about the center of the cavity as the boat 28 pitches (i.e., rotates about its transverse axis) or rolls (i.e., about its longitudinal axis). Similarly, the conical cavity 162 within the transducer is designed to allow the transducer assembly 40 to oscillate within the cavity 90 as the boat pitches and rolls without having the cable 34 impede the movement of the transducer support structure 152.

In the preferred embodiments of the transducer assembly 40 of the present invention, the transducer assembly is intentionally constructed to have an overall specific gravity close to that of the liquid in the cavity. The specific gravity of the assembly 40 may be slightly greater than, equal to or slightly less than that of the liquid. FIGS. 3 and 5 illustrate a first version of the transducer assembly 40 which has a specific gravity slightly heavier than that of the liquid 140. As a result, the assembly 40 tends to have its lower circular edge contacting the spherical cavity 90, as best shown in FIG. 3. The assembly 40 is nearly at equilibrium in the fluid, but not quite, so the frictional forces between edge 158 and the spherical cavity 90 are very light, and thus present very little resistance to the rotation (i.e., oscillation) of transducer 140 about the center of spherical cavity 90. The nominal or average clearance between the exterior spherical surface of transducer assembly 140 and adjacent surface of spherical cavity 90 need not be very large, but is preferably on the order of 0.040 inch to 0.080 inch (and may be greater if desired), in order to ensure that there is not to ©much viscous coupling due to the liquid 140 that is present between the external surfaces of support structure 152 and the wall of cavity 90. If desired, the surfaces of the cavity 90 and transducer assembly 140 which make contact may be lightly coated with a low-friction material such as polytetrafluoroethylene (PTFE) commonly sold under the trademark TEFLON by I.E. DuPont de Nemours Corporation of Wilmington, Delaware, to further reduce friction.

FIG. 7 shows an enlarged cross-section view of the transducer structure 150 of FIG. 3. The transducer structure 150 includes a transducer sandwich 180 including an upper reflecting or buffer layer 182, a piezoelectric crystal layer 184 and a bottom layer 186 which includes at the bottom thereof an emanating face 188. The entire transducer is preferably encapsulated in a coating 190 which hermetically seals the transducer to render it impervious to damage. The transducer sandwich 180 is strictly conventional, and may be purchased for depth-finding applications from any number of companies with the shielded cable 34 having conductors 34a and 34b already attached thereto. Suitable transducer sandwiches are available from Radarsonics of Anaheim, California, as well as other companies in the sonar transducer field. The coating 190 may be an epoxy of satisfactory molecular weight or any other material which is acoustically transparent to the desired frequency range. One suitable material for coating 190 is the PVC material from Teknor Apex Company previously mentioned. The coating 190 can be used as shown to hold the conductors 34a and 34b in place so that instead of extending from the side of the structure 150, they loop around in the coating as shown and extend from the center 194 of the top surface 196 of the structure 150. The electric cable 34 may be of any suitable or conventional type, and preferably includes an insulation layer 198 which may be extended into the coating 190 if desired. Preferably the conductors 34a and 34b are each multi-stranded for increased resistance to breakage due to repeated flexing which will occur during service.

Figure 8:
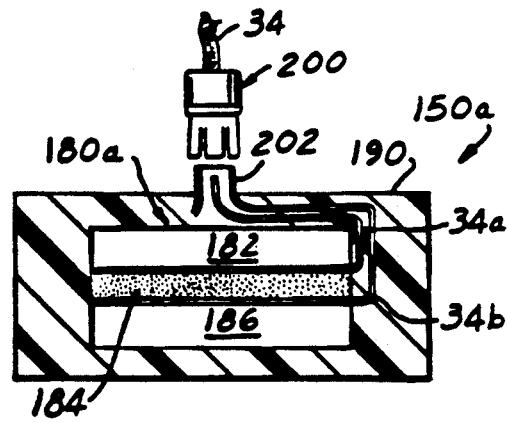
FIG. 8 is a cross-sectional view of a second encapsulated transducer having the same outer size as the FIG. 6 transducer even though the transducer within is of a smaller size.

FIG. 8 shows another transducer structure 150a that has a smaller transducer, which may be a sandwich 180a, a piezoelectric crystal with suitable electrodes (such as silver coating on each side) or any other type of electroacoustical device contained therein. As is well known in the art, the size of commercially available transducers will vary upon a manufacturer, type of emanating element used and its frequency of operation, desired cone angle of the emanating beam of acoustical waves and the like. In order to enable the transducer support means to accommodate all of these various transducers without changing size, the thickness of the coating 190 is simply increased as necessary so that the exterior size of the cylindrical structure 150a is the same as that of transducer structure 150 shown in FIG. 7, even though its transducer structure 180a therein is smaller. However, it is preferred that the thickness of the coating 190 at the emanating face 188 be one-quarter of the wave length of the emanating beam of the transducer.

FIG. 8 also shows another alternative manner for making electrical connections to the transducer assemblies. The end of cable 34 is terminated in a conventional audio signal connector, such as a BNC or phono jack connector 200 shown. A mating BNC receptacle 202 is imbedded into the coating 190 at the time the coating is poured, and thus becomes a part of the transducer structure. The conductors 34a and 34b are connected in conventional fashion to the leads of receptacle 202, and preferably, potted or otherwise sealed from the liquid 140 with a material that can be readily removed at a later date, if necessary. In this manner, the electrical cable 34 may be replaced more easily, without changing the transducer structure.

The transducer structures 150 and 150a will normally have a specific gravity greater than that of the liquid, such as water, which fills the cavity 90. Thus, in order to provide the necessary degree of buoyancy, the transducer support structure 152, best shown in FIGS. 3, 5 and 6, is made at least in part of buoyant material such as closed-cell polyurethane foam. As is well known in the art, closed-cell foam material may be molded into almost any desired shape and in a fairly wide range of densities. The density of the material that structure 152 is made of is selected to be buoyant, and to offset, as much as desired, the weight of the transducer structure. As previously explained, the overall buoyancy of the transducer assembly 40 is controlled so that it is very close to the specific gravity to the liquid being used in to partially fill the cavity and thereby cause the transducer assembly 40 to "float" as desired.

Figure 9:
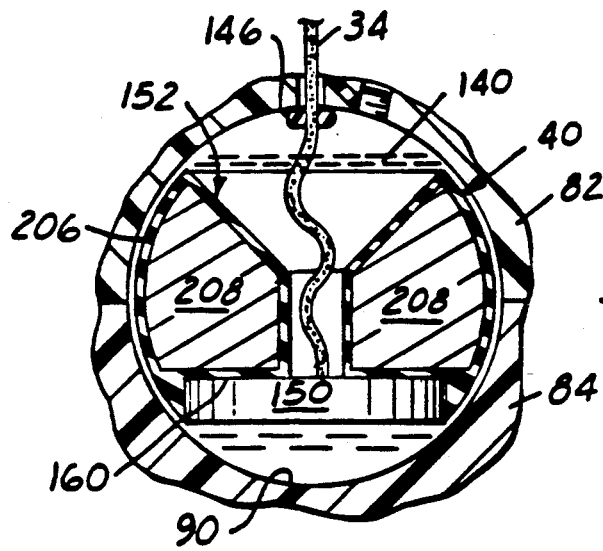
FIG. 9 is a fragmentary cross-sectional side view of a second version of the FIG. 3 transducer which is in equilibrium in the fluidfilled chamber.

As shown by FIG. 9, structure 152 may be made of two or more different types of material with different densities, and may have somewhat different configurations, as long as the overall structure has the desired degree of buoyancy. For example, the structure 152 may have a harder shell 206 that is filled with a lightweight material 208 such as foam. The shell 206, which may be a low friction, high-impact molded plastic material, provides improved wear resistance, reduced friction with the cavity, forms a space frame for the structure 152 for greater structural strength. The foam 208 provides the desired degree of buoyancy, and ensures that the liquid 140 does not leak inside of shell 206. The transducer structure 150 can be permanently or preferably removably fastened to the complementarily-shaped recess 160 provided in the lower portion of shell 206 by any suitable fastening means such as adhesive, set screws (not shown) or the like.

Figure 10:
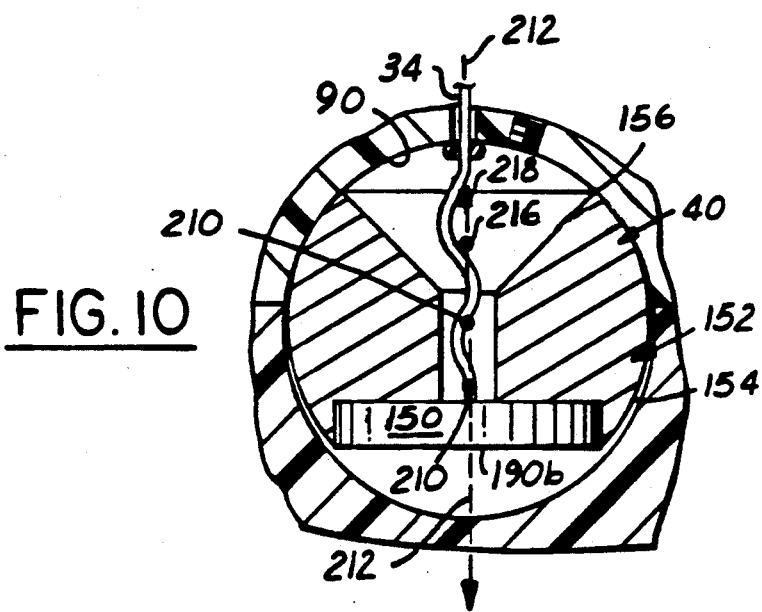
FIG. 10 is a fragmentary cross-sectional side view of a third version of the FIG. 3 transducer which is slightly buoyant and thus tends to remain off of the bottom of the fluid-filled chamber.

FIGS. 9 and 10 show a second and third version of the first embodiment of transducer assembly 40. Beyond the difference in construction of the transducer support means 152 noted above, the only difference between the version shown in FIG. 3 and those in FIGS. 9 and 10 is that the overall specific gravity is different. Specifically, the specific gravity of the transducer assembly 40 shown in FIG. 9 is equal to the specific gravity of the liquid. In FIG. 10, the specific gravity of the overall transducer assembly is less than that of the liquid by a small amount, which causes the transducer to float. In the FIG. 10 version, the upper circular edge 156 of the transducer assembly 40 contacts the wall of cavity 90.

In operation, each of the transducer assemblies 40 shown in FIGS. 3 through 10 all operate essentially on the same principle, which will be explained now with respect to FIG. 10. The spherical cavity 90 has a center represented by dot 210 which is located on the vertical axis 212 shown as a dashed line. Because of the size and essentially spherical shape of the outer surface 154 of the transducer support structure 152, the overall transducer assembly 40 essentially has as its center of rotation at point 210. The points 214 and 216 respectively represent the center of mass and center of buoyancy of the transducer assembly 40. Note that the center of mass 214 is located beneath the center of rotation 210 and the center of buoyancy 216 is located above the center of rotation 210. The transducer assembly 40 is symmetrical in radial directions about the axis 212 and is therefore balanced, which also follows from the location of the center of mass and center of buoyancy on the vertical line 212. Thus, gravity acts on the mass of transducer assembly 40 to maintain the emanating face 190b of transducer 150 in a perfectly horizontal plane, i.e., a plane perpendicular to the gravity vector. Similarly, the forces of buoyancy are centered about the vertical axis 212 as indicated by arrow 218 and act to keep the bottom surface 190b of transducer 150 on a perfectly horizontal plane. The forces of buoyancy are actually gravity-generated forces since it is the displacement of the liquid by the overall assembly 140 which creates such buoyancy forces. It is, of course, gravity which continuously attempts to pull both the water the assembly straight down, thus setting up the physical interactions required to have buoyancy.

FIG. 11 shows a second transducer assembly 240 mounted within a housing 80a substantially identical to housing 80 in FIG. 3, except for certain items which are explained below. The transducer assembly 240 includes a transducer structure 150a of the type shown in FIG. 8, and a transducer support means 252 including first and second support frames 254 and 256 respectively mounted for rotation about first and second axes 258 and 260, which respectively extend longitudinally and transversely through the center 210 of spherical cavity 90. Thus, axis 260 is shown as a dot since it is perpendicular to the page. The support frames 254 and 256 are preferably concentric rings which may be made of metal, high-strength plastic, or any other suitable material. The first ring 254 has axle pins 264 rigidly extending along axis 258 outwardly from opposite sides of the ring into the housing as shown. The pin 264a is shown mounted in a complementarily shaped bore in which it is free to rotate, while the pin 264b is shown journaled into a ball bearing assembly 270 provided in circular recess 272. Either manner of supporting the axle pins may be used. Alternatively, any other suitable form of mounting of the outer ring 254 for rotation about its axis 258 may be employed.

The outer ring 254 preferably has an exterior surface 274 curved in a spherical manner as shown so as to not contact the surface of cavity 90. The inner ring 256 may have a cylindrical exterior surface 276 as shown or may have a spherical surface like the interior surface of ring 254, but smaller in diameter so as to not touch the ring 254. The support frame 256 also includes a bottom support bracket 278 with a cylindrical flange 280 to snugly and rigidly hold the transducer 150a therein. A pair of axle pins extend rigidly outwardly from the ring 256 along transverse axis 260 into corresponding bores provided in outer ring 254, so that the ring 256 is free to rotate about axis 260.

Thus, as may be seen from FIG. 11, the transducer support means 252 of transducer assembly 240 has a gimbal configuration which enables the weight of the relatively heavy transducer 150a to always direct its emanating face in a plane perpendicular to the gravity vector on account of the force of gravity. In order to ensure proper acoustical coupling of the signal produced by transducer structure 150a to the water below, the cavity 90 is once again substantially filled with a liquid transparent to the acoustical signals produced by the transducer. If desired, an optional annular ring 282 of buoyant material may be inserted into and rigidly attached to the inner ring 256 to also create forces of buoyancy which help the transducer 150a always face straight down, in a manner previously explained with respect to FIG. 10

FIG. 12 shows a transverse cross-sectional view of a third embodiment of the transducer apparatus 30 of the present invention which employs a housing 80b identical in all respects to housing 80 of FIG. 3, except for the differences below and shown in FIG. 12. The apparatus 330 includes a transducer assembly 340 which has a transducer structure 150 of the type previously described in FIG. 7 and a transducer support means 352 including a first support frame 354 and a ball bearing 356 located on opposite sides of the frame 354. The frame 354 is preferably a metal or plastic ring with sockets 358a and 358b provided for holding the ball bearings 356a and 356b in place relative to the ring. Guide tracks or channels 360a and 360b are formed as shown in the surface of cavity 90 and provide elongated vertically arranged outer races in which the ball bearings 356 may move. In this manner, the first ring 354 is free to roll clockwise or counterclockwise about the center point 210 and longitudinal axis 258 as the boat to which the apparatus 330 is rigidly attached rolls from port to starboard or vice versa. The ball bearings 356 also enable the ring 354 and transducer 150 to remain level as the boat pitches back and forth, since the bearings enable the transducer assembly 340 to freely rotate about transverse axis 260 relative to the housing 80b as it pitches back and forth with the boat. If buoyant forces are desired, they may be added by inserting a ring or another suitably shaped piece of material 364 into or on the ring 354. The ring 354 may include a bottom bracket 366 with a circular flange 368, if needed, to securely hold the transducer assembly 150 in place.

The electric cable 34 may be provided with a preformed helical coil configuration 374, if desired, in order to reduce the resistance or opposition the wire 34 might otherwise impose upon the oscillation of transducer assembly 330 in any direction in response to the gravity-induced forces.

FIGS. 13 and 14 show two different possible configurations of recesses for the bearing 356. In FIG. 13, which is a cross-sectional view taken along line 13—13 in FIG. 12, the channel 360a is shown to have a triangular shape with two sides 376 and 378. A substantially hemispherical recess 358 is provided for holding the ball bearing 356 in place. In FIG. 14, a rectangular or diamond-shaped recess 380 is shown for holding the ball bearing in place. Any suitable other shapes for the guide track 360 and bearing recess 358 may also be employed.

FIGS. 15 and 16 show side cross-sectional and rear views respectively of a fourth transducer apparatus 430 of the present invention. The apparatus 430 employs a spherical cavity 90, transducer apparatus 352, ball bearings 356 and guide tracks 360, like the FIG. 12 embodiment. However, the configuration of the housing 80b and the magnetic latching mechanism are different and have the shapes shown, and the lower housing portion 84a is made out of an optically and acoustically transparent material. One such material is the Teknor Apex Code No. TA406-75A material previously mentioned. Further, the lower portion 114a of the housing has a wall of substantially uniform thickness so as to minimize any phase change or other distortion of the acoustical signals passing therethrough which might otherwise occur to a small degree on account of differences of thickness of such material. The dashed lines 434a and 434b extending radially outward from the center 210 of the sphere 90 shows that the arc 436 may easily be in the range of 80° to 120° in both the longitudinal directional shown and in the transverse direction into and out of the page. This is more than sufficient travel for any normal rocking or tilting of the craft 28 which may be expected to occur when the sonar system 60 is in use. The front and rear portion 438a and 438b are gently sloped to help to minimize the amount of turbulence (if any) in the vicinity of the bottom portion 114a of the lower housing section 84a as it moves through the water at any rate of speed under 20 or 25 knots.

In FIG. 15, the cable 34 is shown to be provided with a conventional thick waterproof outer jacket for additional strength and protection, and potted or otherwise suitably fastened to cavity 144a in the upper housing 82a. Upper housing 82a may be made of the same material as lower housing section 84a, but for decorative purposes, is preferably made of an opaque high-strength plastic material. Potting compound is used in the aperture 144a to block the entry of any liquid into or out of the cavity 90. A conventional threaded or push-on electrical connector 448 and complementary electrical connector 450 may be used as shown to make it easier to connect or remove portion 454 of cable 34. Conventional twisted pair cable is preferably used for cable 34 since it is less costly than coaxial cable and more flexible.

The magnetic latching mechanism 460 shown in FIGS. 15 and 16 includes a hand-grippable rotatable knob mounted on the singular mounting strut or member 92 that is pivotably supported by pivot pin 94 and mounting blocks 96c and 96d. Specifically the knob 462 includes a shaft 464 which is free to rotate within bore 466. A rectangular magnet 468, polarized as shown, is provided in a complimentarily shaped recess 470 at the end of shaft portion 464. A second stationary rectangular magnet 472 is provided in a recess 474 directly across from magnet 468 as shown, and is polarized in a manner opposite to that of magnet 468. The two magnets 468 and 472 when aligned as shown in FIG. 15 attract one another forcefully, and provide a magnetic latching force which prevents the transducer housing 80b from pivoting upwardly in the direction indicated by arrow 120. But, as previously explained with respect to housing 80 and FIG. 3, when the rearward force 64a becomes sufficiently great, this magnetic latching force between magnets will be overcome, and the housing 80b will rotate rearwardly and upwardly in direction indicated by arrow 120.

The magnets 468 and 472 may be fastened in their respective recesses by epoxy or other conventional fastening means and sealed from the elements by a thin coating of conventional marine anti-fouling material. The knob 460 is retained on the mounting member 92 by thin circular plate 480, which is best seen in FIGS. 15 and 17. Plate 480 is free to rotate within shallow circular recess 482 provided in the member 92. The plate 480 may be attached to knob 462 by screws 484 or any other suitable fastening means.

The magnetic latching force provided by magnets 468 and 472 is adjustable by rotating knob 462 to one of a plurality of positions, which rotates magnet 468 and thus changes the magnetic coupling between magnets 468 and 472. In order to hold the knob 462 more firmly at the desired location, a pair of detent assemblies 488 is provided, each including a ball bearing 494 and spring 492. Each ball bearing normally rests in one of the several depressions 496 provided on the undersurface 498 of the knob 462. Arrow 500 and markings 502 (labeled "1" through "5") may be provided as shown to indicate the position of the knob 462 and the relative degree of latching force provided. Position "5", shown in FIGS. 15 and 16, provides the strongest latching force, while knob position "3", shown in FIG. 18, provides an intermediate latching force, and position "1", shown in FIG. 19, provides the weakest latching force. The monotonically decreasing reduction of latching force provided from positions "5" down to "1" is readily understandable when one considers the reduced common surface area and decreased magnetic coupling produced by placing the opposite magnet poles of 468 and 472 farther away from one another.

FIGS. 20 and 21 are a side cross-sectional view and a bottom view respectively of a fifth embodiment of the present invention, namely transducer apparatus 530. That portion of apparatus 530 not shown may be identical to the corresponding portion of apparatus 430 depicted in FIGS. 15 and 16. Apparatus 530 includes a transducer assembly 540 in spherical cavity 90 which has a transducer structure 150a whose emanating face 188a is not perpendicular to the gravity vector, but instead points in a predetermined direction away from the gravity vector 46 shown in FIG. 20. In the FIG. 20 embodiment, the transducer 150a is shown pointing downward and forward in the plane of the 25 longitudinal axis as shown by arrow 544, approximately 40° from the vertical axis as shown by dashed arc 546. Those skilled in the art will appreciate that the transducer structure 540 may easily be arranged so that arrow 544 fixedly points in any desired direction within about 50° or so of the gravity vector 46. In other words, the direction in which the axis of acoustical sound cone 42a points may be any direction within a cone whose apex is the center of rotation of transducer assembly 540 and whose included angle is about 50° on opposite sides of gravity vector 46.

The transducer assembly 540 includes a transducer support means 542 just like the one shown in FIG. 15, except that-attached to the bottom of the ring 354 are three hangers 560 through 564 which support three counterweights 570 through 574, and two support straps 580 and 584 which support mounting ring 582 used to hold the transducer 150a rigidly in place. The straps 580 and 584 are connected as shown to the counterweights 570 and 574 and help provide rigid support for mounting ring 582. Each of the counterweights 570–574 are equal in mass to the mass of transducer structure 150a, including the connector 202 thereon, so that the entire transducer assembly 540 is accurately balanced about the vertical axis coincident with gravity vector 46. In this manner the force of gravity due to the mass of the transducer assembly 540 pulls straight down along the gravity vector 46 directly below the center 210 of sphere 90, and the forces of buoyancy created by buoyant ring 364a are also directed in a vertical axis coincident with the gravity vector 46 passing through center 210. Thus, for reasons previously explained to the earlier embodiments, the transducer assembly 540 will always have its transducer structure 150a pointing in the direction indicated by arrow 544 in spite of the rolling or pitching of the craft 28 to which the apparatus 530 is attached.

The bottom housing section 84b has its front portion 588 extending closer toward the longitudinal axis 258 in order to permit even higher angles of sonar viewing in the forward direction Arc 590, which is approximately 145°, indicates where the bottom portion or wall 114b has a substantially uniform thickness. This uniformity of wall thickness minimizes any problems with thephase change or other distortions, in the manner previously explained with respect to the embodiment shown in FIGS. 15 and 16.

FIG. 22 illustrates that the transducer apparatuses of the present invention may also be employed in a hull-mount configuration, if desired. In this configuration, a suitably shaped housing is bolted or otherwise attached to the hull of a marine craft 28. The housing 600 may take the configuration shown in FIG. 22 such that a lower portion 602 which is acoustically transparent to the ultrasonic signals projects from beneath the boat. The disadvantage of this approach is that the lower portion 602 of the housing 600 may be struck by objects. As shown in FIG. 23, an alternative housing 610 may be employed which has a lower surface 612 which is flush with the hull of the boat. In either housing 600 or housing 610, any of the transducer assemblies of the present invention may be mounted in a suitably shaped cavity. Thus, for reasons previously explained, the transducer assembly therein would always point straight down, as is illustrated by FIG. 23 (or in some other predetermined direction if desired, like in FIG. 20).

Those skilled in the art will appreciate that the various transducer assemblies used in the apparatuses of the present invention are each balanced about the vertical axis containing the center of rotation. In practice, it may be necessary to check the balance of each such transducer assembly prior to installation into cavity 90./ Any conventional or suitable balancing test equipment may be used for this purpose, and if needed, one or more small weights may be strategically attached to the transducer structure to ensure that the assembly is in balance. Also, marine anti-fouling material may be coated on or impregnated into the exterior surfaces of the transducer apparatuses of the present invention to protect them from the elements.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, the materials employed to construct the housing sections or the transducer assemblies may be varied. The location of the transparent sections of the housing which allow the movement of the transducer assembly to be seen may be varied. Also, a different number of transducers, or different sizes, shapes or configurations of transducers and/or transducer support means may be utilized. The external configurations of the housing and strut members used to support same may be varied, and the shape of the chamber of cavity within the housing may be different. For example for the transducer assemblies shown in FIGS. 11, 12, 15-16 and 20-21, the cavities need not be spherical since only the guide tracks 360 need to be arranged in circular arcs about a common center to achieve their intended function. Thus, in a larger housing, the cavities could be oblong or even rectangular. The size and location of the magnet and/or ferromagnetic material in the magnetic latching mechanisms may also be varied. Accordingly, it is to be understood that the protection sought and to be afforded hereby should be deemed to extend to the subject matter defined by the appended claims, including all fair equivalents thereof.

What is claimed is:

1. A self-aligning transducer apparatus for mounting to a marine craft which employs only gravity-generated forces to maintain a transducer in a predetermined orientation, comprising:
    a transducer housing including an upper housing portion and a lower housing portion, with each housing portion including a curved surface forming part of a substantially spherical chamber within the housing, and the lower housing portion including a region adjacent to the chamber which is transparent to acoustic waves at a predetermined frequency range;
    a liquid filling the chamber to a level of at least about one-half of the chamber;
    a transducer assembly disposed within the chamber of the housing and including an electroacoustic transducer and transducer support means for carrying the transducer so that gravity causes the transducer to be substantially always aligned to produce a cone of ultrasonic acoustic signals in predetermined direction even as the housing of the apparatus pitches and rolls along two perpendicular axes within predetermined ranges of travel, the transducer assembly being constructed to have an overall specific gravity substantially the same as that of the liquid filling the chamber.

2. The transducer apparatus of claim 1, wherein the electroacoustic transducer includes at least one piezoelectric crystal.

3. The transducer apparatus of claim 2, wherein the transducer is hermetically selected with a coating of material that is substantially impervious to deterioration by the liquid.

4. The transducer apparatus of claim 1, wherein the transducer has a squat substantially cylindrical configuration having at least one circular end, and is provided to a plurality of conductors which extend outwardly from the center of the circular end.

5. The transducer apparatus of claim 1, wherein the transducer has an overall specific gravity significantly higher than that of the liquid, and the transducer support means includes flotation material which has a specific gravity significantly lower than that of the liquid, with the volume of the flotation material used relative to the rest of the transducer assembly producing an overall specific gravity for the assembly substantially the same as that of the liquid.

6. The transducer apparatus of claim 5, wherein the overall specific gravity of the transducer assembly being slightly higher than that of the liquid.

7. The transducer apparatus of claim 5, wherein the overall specific gravity of the transducer assembly is equal to that of the liquid.

8. The transducer apparatus of claim 5, wherein the overall specific gravity of the transducer assembly is slightly lower than that of the liquid.

9. The transducer apparatus of claim 1, wherein each housing portion includes a substantially hemispherical chamber portion.

10. A transducer apparatus for marine pleasure craft, comprising:
    a transducer housing including first and second portions and a chamber, the first portion of the housing being below at least part of the chamber and being acoustically transparent at a desired range of frequencies, and the second portion of the housing being optically transparent; and
    a self-righting transducer assembly mounted for movement within the chamber by force of gravity as the orientation of the transducer housing is changed.

11. A transducer apparatus as in claim 10, further comprising:
    a liquid filling the chamber to a level of at least about one-half of height of the chamber, and wherein
    the transducer assembly includes an electroacoustic transducer and transducer support means for substantially floating the transducer within the liquid so that gravity causes the transducer to be substantially always aligned to produce a cone of ultrasonic acoustic signals in predetermined direction even as the housing of the apparatus pitches and rolls within predetermined ranges of motion.

12. A transducer apparatus as in claim 10, wherein the first and second portions of the housing are substantially the same, and constitute a bottom portion of the housing.

13. A transducer apparatus as in claim 12, wherein:
    the transducer has an overall specific gravity significantly higher than that of the liquid, and the transducer support means includes a flotation material which has a specific gravity significantly lower than that of the liquid, with the volume of the flotation material used relative to the rest of the transducer assembly producing an overall specific gravity for the assembly substantially the same as that of the liquid.

14. A self-aligning transducer apparatus, comprising:
    a transducer housing having a substantially spherical cavity therein and a bottom wall portion generally beneath the cavity which is substantially transparent to acoustic waves within a predetermined frequency range;

a liquid at least partial filling the cavity, which is substantially transparent to acoustic waves within the predetermined frequency range;

a transducer assembly having a transducer structure nd transducer sup-port means for buoyantly supporting the transducer structure within the liquid for rotation about the center of the spherical cavity, the transducer structure including an electroacoustical transducer which has a specific gravity greater than that of the liquid, and the transducer support means including flotation material having a specific gravity lower than that of the liquid, and having a curved exterior surface which guides movement of the transducer assembly about the center of the spherical cavity, the transducer assembly being constructed to have an overall specific gravity substantially the same as that of the liquid filling the chamber.

15. A transducer apparatus as in claim 14, wherein the transducer structure has a squat cylindrical configuration with circular upper and lower surfaces; and an electrical cable, connected at the center of the upper surface, and extending generally upwardly toward the highest portion of the spherical cavity, for passing electrical signals between the transducer and a remote control unit, the cable having a predetermined amount of slackness, thereby helping to ensure that the cable will not significantly affect the ability of the transducer assembly to move in response to gravity acting thereon.

16. A transducer apparatus as in claim 14, wherein the exterior surface of the transducer support means forms part of a truncated sphere which is sized substantially the same as, but very slightly smaller than the spherical cavity.

17. A self-aligning transducer apparatus, comprising:
a transducer housing having a cavity located therein and a bottom wall portion generally beneath the cavity which permits acoustic waves with a predetermined frequency range to readily pass therethrough;

a liquid at least partially filling the cavity, which permits acoustic waves within a predetermined frequency range to readily pass therethrough;

a transducer assembly having a transducer structure and transducer support means for supporting the transducer structure for rotation about a predetermined center of rotation located within the cavity, the transducer structure including an electroacoustical transducer, the transducer support means including first and second support frames respectively mounted for rotation about first and second aces perpendicular to one another and which pass through the center of rotation, and wherein the electroacoustical transducer has specific gravity greater than that of the liquid, and the transducer support means including material having a specific gravity less than that of the liquid, with the transducer assembly being constructed to have an overall specific gravity substantially the same as that of the liquid in the cavity.

18. A transducer apparatus as in claim 17, wherein:
the first support frames includes a first ring, and the second support frame includes a second ring which is mounted to and for rotation within the first ring in a gimbal configuration, and
the transducer structure is rigidly mounted to the second ring below the center of rotation.

19. A transducer apparatus as in claim 18, wherein the cavity is substantially spherical and has its center coincident with the center of rotation, and at least the first ring has an exterior surface complementary to a portion of the substantially spherical cavity.

20. A magnetically coupled transducer apparatus which is releasably held in place relative to the exterior of a marine pleasure craft, the transducer apparatus comprising:
a transducer housing;
means for pivotably supporting the housing; and
magnetically coupled latching means for releasably holding the transducer housing in place relative to the exterior of the craft, the latching means including at least one magnet for retaining the housing in the predetermined location relative to the exterior of the craft until sufficient force is applied to the housing such that the magnetic holding force of the latching means is overcome, at which tie the means for pivotally supporting allows the housing to pivot away from the predetermined location.

21. A self-aligning transducer apparatus, comprising:
a transducer housing having a cavity located therein and a bottom wall portion generally beneath the cavity which permits acoustic waves within a predetermined frequency range to readily pass therethrough, a liquid at least partially filling the cavity, which permits acoustic waves within a predetermined frequency range to readily pass therethrough;

a transducer assembly having a transducer structure and transducer support means for supporting the transducer structure for rotation about a predetermined center of rotation located within the cavity, the transducer structure including an electroacoustical transducer, the transducer support means including a support frame mounted for rotation about first and second axes of rotation perpendicular to one another with the location of at least one of the axes being determined at least in part by ball bearings located on opposite sides of the support frame.

22. A transducer apparatus as in claim 21, wherein:
the first support frame includes a first ring, and the housing has interior surfaces defining the cavity which include a plurality of guide tracks arranged in a common plane which allows the ball bearings to move back and forth therein so that the support frame can partially rotate about the second axis of rotation.

23. A transducer apparatus as in claim 21, wherein the transducer structure is rigidly mounted to the first ring below the center of rotation.

24. A transducer apparatus as in claim 23, wherein the cavity is substantially spherical and has its center coincident with the center of rotation, and the first ring has an exterior surface complementary to a portion of the sphere.

25. A transducer apparatus as in claim 21, wherein the electroacoustical transducer has a specific gravity greater than that of the liquid, the transducer support means includes material having a specific gravity less than that of the liquid, and the transducer assembly is constructed to have an overall specific gravity substantially the same as that of the liquid in the cavity.

26. A self-aligning transducer apparatus, comprising:
a transducer housing having a cavity;
a liquid at least partially filling the cavity; and a transducer assembly mounted within the cavity and including an electroacoustic transducer and transducer support means for carrying the transducer, the transducer assembly having a center of rotation, a center of buoyancy, and a center of mass nominally arranged along a common vertical axis coincident with the gravity vector, with the center of buoyancy being located above the center of rotation, and the center of mass located below the center of rotation.

27. A transducer apparatus as in claim 26, wherein the transducer includes a least one disc-shaped surface and the transducer assembly further comprises an electrical cable for passing electrical signals between the transducer and a remotely located apparatus for processing the electrical signals, the electrical cable being connected to the center of the disc-shaped surface.

28. A transducer apparatus as in claim 26, wherein the transducer support means includes buoyant material arranged concentrically about the vertical axis and generally vertically above the transducer.

29. A transducer apparatus as in claim 26, wherein:
the transducer includes a sandwich of two plates with at least one piezoelectric crystal, and
the transducer includes a coating of material encapsulating the sandwich which is substantially impervious to the liquid within the cavity.

30. A transducer apparatus as in claim 26, wherein in the level of the fluid within the cavity is substantially no higher than an uppermost portion of the transducer support means such that movement of the transducer support means away from the nominal vertical axis results in a portion of the transducer support means protruding out the liquid, which thereby causes an additional self-righting force being imposed upon the transducer assembly to cause the axis of the transducer assembly to be coincident with the gravity vector.

31. A transducer apparatus as in claim 20, wherein:
the magnetically coupled latching means includes at least a second magnet disposed opposite the magnet, and
at least one of the magnet or ferromagnetic member is adjustable to allow the level of magnetic coupling to be varied as desired between a plurality of possible settings.

32. A transducer apparatus as in claim 20, wherein the means for pivotally supporting includes at least one strut member rigidly attached to and extending generally upwardly away from the housing, and at least one pivot mechanism to which the strut member is pivotally connected.

33. A transducer apparatus as in claim 32, further comprising:
a transducer assembly mounted within the housing and including an electroacoustic transducer and transducer support means for carrying the transducer.

34. A transducer apparatus as in claim 32, wherein:
the transducer housing includes a chamber, and a bottom wall portion below at least part of the chamber which is acoustically transparent at a desired range of frequencies, and a top wall portion above at least part of the chamber which is electrically shielded, and
the transducer assembly is mounted within the chamber.

35. A transducer apparatus as in claim 34, further comprising:
a liquid filling the chamber to a level of at least about one-half of the height of the chamber, and
transducer support means for carrying the transducer so that gravity causes the transducer to substantially always aligned to produce a cone of ultrasonic acoustic signals in predetermined direction even as the housing of the apparatus pitches and rolls within predetermines ranges of motion, the transducer assembly being constructed to have an overall specific gravity substantially the same as that of the liquid filling the chamber.

* * * * *